United States Patent Office 3,579,546
Patented May 18, 1971

3,579,546
ORGANIC SULFONATE PRODUCTION BY
BUFFERED ADDITION OF BISULFITE
TO UNSATURATED HYDROCARBONS
Charles J. Norton, Berkeley, Calif., assignor to Marathon
Oil Company, Findlay, Ohio
No Drawing. Filed Sept. 30, 1968, Ser. No. 763,929
Int. Cl. C07c *143/90*
U.S. Cl. 260—400                                10 Claims

ABSTRACT OF THE DISCLOSURE

This invention details a process for the manufacture of organic sulfonates from unsaturated hydrocarbons containing 6 to about 30 carbon atoms per molecule including reacting the unsaturated hydrocarbons and bisulfite in a cosolvent system comprising water and an organic hydroxyl-containing compound at from 0 to about 300° C. in the presence of a free radical initiator. Also, a sufficient quantity of a buffer compound is present to maintain the pH from about 5 to about 9, where the buffer is a partially neutralized non-bisulfite poly-basic weak acid. The buffer is left in the reaction mixture as a builder for the final alkane sulfonate highly biodegradable low foam detergent formulation.

CROSS REFERENCES TO RELATED APPLICATION

Our copending application, Ser. No. 486,137, filed Sept. 9, 1965, assigned to the assignee of the present invention, related generally to this invention and details a process for the preparation of sulfonates by reacting olefins and bisulfite in the presence of a catalyst, preferably a nitrate of zinc, aluminum, or potassium.

BACKGROUND OF THE INVENTION

The field of this invention relates to the preparation of organic sulfonates and is particularly related to the production of such sulfonates from unsaturated hydrocarbons by reacting them with bisulfite in the presence of a free radical initiator and solvent reaction media. More specifically, the area of this invention relates to obtaining superior yields of organic sulfonates by controlling the reaction conditions, in particular by controlling the pH of the reaction within a desired range.

Much work has been done in the search for a commercially economical process for the production of organic sulfonates by reaction of hydrocarbons with inorganic bisulfites. Such a process is especially desirable because of the high marketability of the product and the relatively low cost of the individual raw materials. Previous work has been patented in the United States, as for example in U.S. Pats. 2,653,970, 3,084,186, and 3,168,555, and abroad as for example in British Pat. 995,376. However, to my knowledge, no process for production of organic sulfonates by reaction of the unsaturated hydrocarbons with inorganic bisulfites has been found sufficiently economic to be practiced on a commercial scale.

The above-cited patents all demonstrate in varying degrees the importance of controlling the pH. Various ranges of pH have been found to be beneficial to the reaction forming organic sulfonates. Specifically, it has been found that maintaining the pH in the range of from about 5 to about 9 produces high purity organic sulfonates in high yields and conversions and generally with excellent surfactant properties. Furthermore, detergent compounds formed under strict pH control reaction conditions exhibit very highly desirable biodegradability and low foam characteristics. However, previous methods for controlling pH have generally comprised a provision for electromechanically monitoring the pH of the reaction by addition of acid or caustic. These methods not only necessitate continual overseeing and constant control of the reaction, but also afford a non-continuous and relatively expensive method of attempting to control the pH.

SUMMARY OF THE INVENTION

This invention solves the problem inherent in the prior art by providing a method for the preparation of organic sulfonates from bisulfite addition to unsaturated hydrocarbons in the presence of a free radical initiator and cosolvent system by adding to the solution a buffer compound which continuously maintains the pH of the reaction mixture within the desired limits without necessity of a monitoring method for control of pH. The pH is automatically controlled within the desired ranges by selection of a desirable buffer for any given reaction conditions.

The buffers of this invention are further useful and provide an advantage over the prior art by being concurrently utilized as builders for the final detergent composition. Heretofore, pH controlling agent such as caustic, e.g. sodium hydroxide, or mineral acid, has been added to the reaction mixture and their salts sometimes left in the reaction product mixture as an extender for the final detergent composition. However, these extenders possess no detergent enhancing qualities and are often uneconomical, whereas, the buffer-builders of the present invention enhance the detergency of the reaction product mixture and serve as excellent inexpensive builders with detergent properties in themselves for the final detergent composition. Thus, the buffers of the present invention serve the dual purpose of economical pH controlling agent and beneficial detergent builder. By builder is meant a substance added to soaps or synthetic detergents or used with them to increase their cleansing action (Webster's Third New International Dictionary, G. & C. Merriam, Co., 1968).

The products of this invention are organic sulfonates with excellent surfactant properties and are highly biodegradable, low foam detergents. When terminal olefins of carbon numbers $C_{12}$ to $C_{14}$ are utilized as reactants in this invention, a high quality shampoo detergent is formed. Likewise, when $C_{15}$ to $C_{20}$ olefins are employed, excellent liquid detergent and bar soap compositions are formed. These uses are merely illustrative of the vast number of uses organic sulfonates of the type formed by the process of this invention have.

DESCRIPTION OF THE PREFERRED EMBODIMENTS

The hydrocarbon starting materials useful in the present invention are unsaturated, having either triple or more preferably, double bond(s). In general, although cyclic or branched chained olefins containing at least one unsaturated bond can be utilized, preferably acyclic straight chained olefins are preferred containing from about 6 to about 30 carbon atoms and more preferably from about 10 to about 22 carbon atoms, and most preferably from about 14 to about 19 carbon atoms per molecule. While polyenes may be utilized, monounsaturated compounds are preferred. The most preferred compounds in the present invention will be the alpha (that is, terminal) olefins. Mixtures of the above hydrocarbon may be utilized and it is a feature of the present invention that the reaction proceeds with relative insensitivity to the molecular weight or chain length of the hydrocarbon raw materials. That is, it permits the sulfonation of each of the various components of hydrocarbon mixtures to substantially the same degree.

Commercially pure hydrocarbons will, in general, be suitable for the process of the invention, but contamination by compounds having labile hydrogen (and thus capable of forming relatively stable free radicals), e.g. compounds containing diallylically activated carbon-hydrogen bonds, should preferably be avoided. Such materials may be removed from reaction mixtures with acid treatment or by adsorption with alumina, silica gel, or other solid adsorbent.

The unsaturated hydrogen feed stock may be preaerated as more fully described in copending application S.N. 520,632. Thus, the preaeration may be accomplished with an oxygen-containing gas mixture which does not interfere with the reactions of the present invention and which contains a substantial amount of oxygen, preferably at least about 5% and more preferably at least about 20% oxygen. For reasons of economy, air is the most preferred oxygen-containing gas.

Alkali metal or ammonium bisulfite salts are the most preferred source of bisulfite ions. However, any non-interfering compound which forms bisulfite ions in the reaction mixture may be utilized. In addition to bisulfites, non-interfering pyrosulfites and metabisulfites or other sulfites may be used as may other compounds which produce bisulfites in situ under the conditions of the reaction, as for instance by bubbling $SO_2$ in situ in basic solution. Preferably, from about 0.1 to about 10 and more preferably 0.5 to 5.0 moles of bisulfite are utilized per mole of unsaturation in the unsaturated hydrocarbons. Optimum results are generally obtained with from 1.0 to about 2.0 moles of sodium bisulfite per mole of unsaturation in the hydrocarbon. In our process, under most conditions, and with most starting materials, nearly stoichiometric proportions of bisulfites can be employed with excellent yields. This is a very practical and economical advantage.

The addition reaction is preferably conducted in the presence of a solvent which is substantially non-reactive with the starting materials and the end product. Suitable solvents include liquid hydrocarbon derivatives having suitable boiling points, esters, ethers, alcohols, glycols, amines, and amino alcohols. Particularly preferred are organic hydroxyl containing compounds, especially low molecular weight alcohols, $C_1$ through $C_{10}$ preferably, and more preferably $C_1$ through $C_5$, e.g. methanol, ethanol, and isopropyl alcohol, because of their good solubilizing properties, ready availability, and convenient recovery. The most readily available alcohols useful for this invention are the secondary alcohols and a preferred method of recovery of the solvent is by vacuum flashing. From 0.25 to about 10 volumes of solvent will generally be utilized per volume of unsaturated hydrocarbon reactant, and about 1:1 is the most preferred volume ratio.

Preferably the solvent system will contain water. Preferably, there will be from about 0.1 to 10 and more preferably from 0.5 to 2 volumes of water per volume of alcohol in the reaction mixture. The cosolvent system acts to at least partially solubilize the hydrocarbon-bisulfite mixture. The most preferred reaction media composition comprises 1 volume of water per volume of isopropyl alcohol.

A surfactant may be added to the reaction mixture in amounts of from 0.1 to about 5%, by weight. While the presence of the surfactant is not necessary to the present invention, it does often increase conversion rates significantly. Preferred surfactants are the conventional higher alkyl sulfonates, but a wide variety of cationic, non-ionic and anionic surfactants may be employed. The product of the reaction is most preferred.

The reaction is initiated and sustained by addition of a free radical initiator to the reaction mixture or formation of one in situ, in an amount preferably from 0.01 to about 1 mole and more preferably from about 0.05 to about 0.20 moles per mole of unsaturated hydrocarbon charged. These initiators are preferably selected from oxygen-containing gases, peroxides, and hydroperoxide. Examples of useful free radical initiators are air, which form hydroperoxide and peroxide initiators in situ, and other gases containing at least 5% and preferably at least 20% oxygen, pure reagent peroxides exemplified by benzoyl peroxide, acylperoxide, cumenehydroperoxides, and tertiary peroxides such as di-tert-butyl peroxides, and other free radical initiating agents such as azobisisobutyronitrile. Peroxides can be formed in situ by aeration of the olefin as taught in my co-pending application S.N. 520,632, assigned to the same assignee as the present invention. The importance of the free radical initiator is to selectively oxidize bisulfite to sulfite radical-ion without formation of sulfate ion.

The buffer compounds useful for the instant invention are salts of weak, polybasic acids, that is, the reaction product of a weak acid and a strong base. A specifically inapplicable buffer species is the bisulfite salt itself, e.g. sodium bisulfite, which is unstable under the reaction conditions, oxidizing to the sodium sulfate salt, an extender and not a builder. Furthermore, during oxidation of sodium bisulfite, undesirable acid sulfate is formed which shifts the pH of the reaction mixture to the acidic range, so that the bisulfite salt does not act either as a buffer or as a builder as necessary for the process of this invention. The buffer salt should be substantially soluble under the reaction conditions. Preferred cations include ammonium, alkyl ammonium, arylammonium, and other non-interfering substituted ammonium; alkali metals, such as lithium, sodium and potassium; alkaline earth metals such as magnesium and calcium, with the most preferred cations being ammonium, sodium, and potassium. The anions of the buffer may be either inorganic or organic, where the preferred inorganic anions include phosphates, borates, carbonates, bicarbonates, and silicates, and where the preferred organic anions are selected from citrates, acetates, maleates, fumarates, and succinates.

Table I summarizes some examples of buffer-builders that may be used in accordance with the preferred embodiment of this invention. A 70 ml. aqueous solution of these builders are made up, the pH is noted in the table, along with the pHs obtained when the solution is added to 26 gms. of sodium bisulfite.

TABLE I.—BUFFERING BUILDERS

[Solution 70 milliliters $H_2O$]

| Builder buffer | pH alone | pH with 26 grams $NaHSO_3$ |
| --- | --- | --- |
| Trisodium nitriloacetate monohydrate, 20 grams | [1] 10.1 | [2] 6.25 |
| Sodium phosphate tripoly, 20 grams | [1] 8.25 | [2] 5.75 |
| Sodium pyrophosphate, 20 grams | [1] 9.25 | [2] 6.00 |
| Potassium phosphate, dibasic, 13.0 grams } Potassium phosphate, monobasic 19.5 grams } | 6.82 | 5.88 |
| Potassium phosphate, dibasic, 40 grams | 10.1 | 6.20 |

[1] Saturated.
[2] Clear solution.

Additional examples of buffer solutions are enumerated in Table II where the pH range of the solution is within the range of from 5 to 9. This table is an abbreviated table taken from Determination of pH: Theory and Practice, Roger G. Bates, John Wiley and Sons, 1964, page 19.

TABLE II.—PH RANGES OF BUFFER SOLUTIONS

| Acidic component | Basic component | pH range | Reference |
|---|---|---|---|
| KH phthalate | NaOH | 4.0–6.2 | b |
| NaH succinate | Na₂ succinate | 4.8–6.3 | d |
| Na₂H citrate | NaOH | 5.0–6.3 | a |
| NaH maleate | NaOH | 5.2–6.8 | |
| KH₂PO₄ | NaOH | 5.8–8.0 | b |
| KH₂PO₄ | Borax | 5.8–9.2 | c |
| NaH₂PO₄ | Na₂HPO₄ | 5.9–8.0 | a |
| HCl | Triethanolamine | 6.7–8.7 | |
| HCl | Na diethylbarbiturate | 7.0–9.0 | e |
| Diethylbarbiturate acid | do | 7.0–9.0 | |
| H₃BO₃ or HCl | Borax | 7.0–9.2 | a, e |
| HCl | Tris (hydroxymethyl)-aminomethane | 7.2–9.0 | |
| H₃BO₃ | NaOH | 8.0–10.0 | b |
| K p-phenolsulfonate | NaOH | 8.2–9.8 | |
| Glycine | NaOH | 8.2–10.1 | a |
| NH₄Cl | NH₄OH | 8.3–9.2 | |
| Glycine, Na₂HPO₄ | NaOH | 8.3–11.9 | |
| HCl | Ethanolamine | 8.6–10.4 | |

These listings are illustrative, and there are other buffers which will be operative for the purposes of this invention, although their economic feasibility may be questionable. For instance, compatible mixtures of above mentioned buffers may be utilized advantageously if desired.

It is basically important that the amount and actual species of buffer be selected so as to control the pH within a range of from about 5 to about 9 and more preferably from about 6 to about 8 and most preferably from about 6.5 to about 7.5. In the most preferred range, the buffer will neutralize any excess acid or base that is produced during the course of the reaction and thus keep the reaction within the desired pH range. One factor which will determine the selection and amount of buffer is the concentration of the sodium bisulfite (or other bisulfite) put into the solution, since the sodium bisulfite is of an acidic nature and unbuffered will cause the pH of the reaction to be outside the range desired for best conversions, yields, and fastest rates of reaction. For the most preferred embodiment of this invention, is in preferable to add from 50 to about 400 weight percent buffer based on the anticipated organic sulfonate product to be formed.

Many commercial detergent formulations contain 2 to 4 times as much inorganic builder as actual organic detergent, so that the buffer can be left in the product mixture to be incorporated into the final detergent composition, and for convenience preferably is. If desired all or a portion of the buffer may be removed by selective precipitation of the buffer salts by the addition of an anti-solvent such as alcohol, and/or a low-molecular weight ketone, preferably acetone. Based on the amount of charged unsaturated hydrocarbon, there will be preferably from about 0.1 to about 100 and more preferably from about 1 to about 20 and most preferably from about 2 to about 10 moles of buffer present in the reaction mixture per mole of unsaturated hydrocarbon reactant.

The most preferred buffer systems are those derived from the type of materials currently being used as builders in detergents, such as alkali metal, alkaline earth metal, ammonium or substituted ammonium monobasic phosphate, dibasic phosphate, tripolyphosphate, pyrophosphate, nitriloacetate, carbonate, borate, and borax systems. Especially preferred are the phosphate builders, which are widely recognized as useful building agents, as taught for instance in "Phosphoric Acids and Phosphates," Encyclopedia of Chem. Thechnology, Interscience Encyclopedia, Inc., vol. 10, pp. 435–440.

Catalysts are not necessary to the reactions of the present invention, but the co-catalytic system disclosed in co-pending application Ser. No. 486,137 to the same assignee filed Sept. 9, 1965 can be employed in the present invention.

The bisulfite addition reaction step is preferably conducted under vigorous agitation, e.g. mechanical stirring. The apparatus utilized for the bisulfite-addition reaction will vary with the temperatures and pressures selected but will in general be a conventional autoclave or fluid type reactor. In general, the temperature of the reaction will range from preferably about 0 to about 300° C. and more preferably from about ambient temperature to 200° C. and most preferably from about 50 to about 150° C.

Pressure during the bisulfite addition is not narrowly critical and may be from 10 p.s.i.a. to about 100 atmospheres but pressures from one atmosphere to about 100 p.s.i.a. are more preferred. Generally, atmospheric pressures are favorable. When an oxygen-containing gas, such as air, is used as the free radical initiator, the pressure should be such that the oxygen partial pressure is preferably from 1 to about 10 mole percent of the gas phase, and more preferably from about 2 to about 5 mole percent of the gas phase. These values, of course, are temperature dependent.

The time of reaction will generally be preferably from about 0.1 to about 100 and more preferably from about 0.5 to about 20 and most preferably from about 1 to about 5 hours.

It should be understood that while the following examples describe the invention on a batch basis, it may, of course, be practiced on a continuous basis, with continuous flows of starting materials into the reactor. It should be further understood that the following examples are merely illustrative of the preferred embodiments of this invention and should not limit the invention in any manner.

EXAMPLE 1

A 500 ml. round-bottom, Morton flask equipped with a thermometer, thermo-controller, air-flow inlet, stirrer, and condenser is charged with 70 ml. isopropyl alcohol, 70 ml. water 0.2 mole preaerated Chevron $C_{15}$ through $C_{18}$ alpha-olefins (45.78 gms., 58 ml., 228 molecular weight), 0.25 mole (26.02 gms.) sodium bisulfite, and 40 gms. (0.23 mole) potassium dibasic phosphate ($K_2HPO_4$). The reagents are stirred and the system brought to reflux at 76° C. giving an initial pH of 6.2 at this temperature. A net desirable reaction forming the sulfonate is indicated by the initial upper drift in the pH from 6.2 during the first hour to hour-and-a-half run. After about 2 hours, the final pH in the system remains constant at 7.6. The reaction proceeds very smoothly. The initial system is very cloudy due to the three-phase system and eventually becomes semi-translucent. A small, heavy aqueous salt phase is obtained in the product solution. The total wet weight input is 236.72 gms. The weight of the recovered product mixture is 230.85 gms. indicating a material balance of 97.5 weight percent. The reaction product is poured into about 2 liters of acetone which gives a solid precipitate for analysis. The analysis and yields of solid mixture are given in Table III.

TABLE III.—SULFITE ADDITION TO PREAERATED CHEVRON $C_{15}$–$C_{18}$ ALPHA-OLEFIN

| | Product | | | | | |
|---|---|---|---|---|---|---|
| Experiment | Conversion weight percent | Grams solid | Percent C | Percent H | Percent activity calculated as monosulfonate | Theoretical yield weight percent |
| Example: | | | | | | |
| 1 | 90 | 98.82 | 32.06 | 5.37 | 57.9 | 94 |
| 2 | 88 | 81.50 | 33.92 | 5.82 | 54.7 | 76 |

This dry mixture comprises 40.6 weight $K_2HPO_4$ builder and 57.9 weight percent alkane sulfonate surfactant. It is soapy in appearance and feels and exhibits good detergent and foam properties when added to hard water (i.e. water having high calcium or magnesium ion concentrations).

EXAMPLE 2

The same amounts of reagents are used as in Example 1 and are charged to a high speed Waring Blendor. The glass vessel is heated with a flexible gas cap heater controlled with a thermocontroller on the thermometer to give a temperature of about 74° C. The vessel is also equipped with a pH probe. The reaction history is summarized in Table IV below.

TABLE IV

| Time, minutes: | Temperature, °C. | pH |
|---|---|---|
| 0 | 39 | 6.65 |
| 9 | 59 | 6.50 |
| 20 | 72 | 6.90 |
| 42 | 74 | 7.14 |
| 56 | 74 | 7.14 |
| 71 | 74 | 7.12 |
| 135 | 74 | [1] 7.12 |

[1] Reaction turned off.

The Waring Blendor vessel is drained into a beaker and 152.1 gms. of solid is obtained out of the original charge of 236.72 gms. of reagent. This is a total material balance of 64.2%. Most of the weight loss is due to the volatilization of water and isopropyl alcohol in the open Waring Blendor vessel. The reaction product mixture is diluted with 400 mls. of water and allowed to stand in a separatory funnel overnight. No distinct oil phase separates on standing, indicating a good conversion and yield of sulfonate. The product is precipitated with acetone and submitted for analysis. The analysis is summarized in Table III above.

It should be understood that the invention is capable of a variety of modifications and variations which will be made apparent to those skilled in the art by reason of this specification and which are to be included within the spirit of the claims appended hereto.

What is claimed is:

1. A process for the manufacture of organic sulfonates from unsaturated hydrocarbons having from about 6 to about 30 carbon atoms per molecule comprising reacting 0.1 to 10 moles of bisulfite per mole of unsaturated hydrocarbon in a solvent comprising water and an organic hydroxyl containing compound having from one to about 10 carbon atoms at from about 0 to about 300° C. at from 10 p.i.s.a. to about 100 atmospheres in liquid phase for 0.1 to 100 hours, in the presence of a free radical initiator selected from the group consisting of oxygen-containing gases, peroxides, hydroperoxides and azobis-isobutyronitrile and in the presence of from about 0.1 to about 100 moles of a buffer compound per mole of unsaturated hydrocarbon in the reaction mixture to maintain the pH in the range of from about 5 to about 9 and wherein said buffer is a non-bisulfite salt of a polybasic weak acid substantially soluble under the reaction conditions, and thereafter recovering a mixture comprising said organic sulfonates and at least a portion of said salt of a polybasic weak acid which has remained substantially chemically unaltered during the course of the reaction.

2. The process of claim 1 wherein the buffer is selected from the group consisting of ammonium, substituted ammonium, alkali metal, and alkaline earth metal salts of monobasic phosphate, dibasic phosphate, tripolyphosphate, pyrophosphate, nitriloacetate, carbonate, borate, and borax systems.

3. The process of claim 2 wherein there are from about 1.0 to about 2.0 moles of buffer per mole of unsaturated hydrocarbon in the reaction mixture.

4. The process of claim 1 wherein the unsaturated hydrocarbons are monounsaturated olefinic hydrocarbons.

5. The process of claim 4 wherein the olefins are straight-chain terminal olefins having from 10 to 22 carbon atoms.

6. The process of claim 1 wherein the solvent comprises from about 0.1 to about 10 volumes of isopropyl alcohol per volume of water.

7. The process of claim 1 wherein the free radical initiator is air containing not less than about 5% oxygen.

8. The process of claim 1 wherein the buffer maintains the pH of the reaction in the range of from 6 to about 8.

9. The process of claim 1 wherein the buffer compound is comprised of an acidic component and a basic component.

10. A process for the manufacture of organic sulfonates from unsaturated hydrocarbons having from about 6 to about 30 carbon atoms per molecule comprising reacting 0.1 to 10 moles of bisulfite per mole of unsaturated hydrocarbon in a solvent comprising water and an organic hydroxyl compound having from one to about 10 carbon atoms at from 0 to about 300° C. at from 10 p.s.i.a. to about 100 atmospheres in liquidphase for 0.1 to about 100 hours, in the presence of a free-radical initiator selected from the group consisting of oxygen-containing gases, peroxides, hydroperoxides and azobisisobutyronitrile and in the presence of from 0.1 to about 100 moles of a buffer compounds per mole of unsaturated hydrocarbon in the reaction mixture to maintain the pH in the range of from about 5 to about 9, wherein said buffer compound is substantially soluble under the reaction conditions and has cations selected from the group consisting of ammonium, substituted ammonium, lithium, sodium, potassium, magnesium, and calcium, and anions selected from the group consisting of phosphates, borates, carbonates, bicarbonates, silicates, citrates, acetates, maleates, fumarates and succinates, and thereafter recovering a mixture comprising said organic sulfonates and at least a portion of said buffer compound which has remained substantially chemically unaltered during the course of the reaction.

References Cited

UNITED STATES PATENTS

| 2,945,816 | 7/1960 | Schmolka | 252—161 |
| 3,424,770 | 1/1969 | Stein et al. | 260—400 |

ELBERT L. ROBERTS, Primary Examiner

U.S. Cl. X.R.

252—121

UNITED STATES PATENT OFFICE
CERTIFICATE OF CORRECTION

Patent No. 3,579,546              Dated    May 18, 1971

Inventor(s)    Charles J. Norton

It is certified that error appears in the above-identified patent and that said Letters Patent are hereby corrected as shown below:

Col. 5, line 40:    "is in"       should read    --it is--

Col. 6, line 66:    "$C_{15}$"       should read    --$C_{18}$--

Claim 3, line 2:    "2.0"        should read    --20--

Signed and sealed this 31st day of August 1971.

(SEAL)
Attest:

EDWARD M. FLETCHER, JR.          WILLIAM E. SCHUYLER, JR.
Attesting Officer                Commissioner of Patents